United States Patent [19]

Siewert

[11] Patent Number: 5,758,594
[45] Date of Patent: Jun. 2, 1998

[54] MOULDED BOAT HULL INCLUDING TRANSOM REINFORCING GUSSETS

[75] Inventor: Gregory Siewert, Durham, N.C.

[73] Assignee: Allied Logic Corporation, Durham, N.C.

[21] Appl. No.: 595,290

[22] Filed: Feb. 1, 1996

[51] Int. Cl.[6] ............................................. B63B 5/24
[52] U.S. Cl. .................................................... 114/357
[58] Field of Search ................................. 114/355, 356, 114/357, 271, 274

[56] References Cited

U.S. PATENT DOCUMENTS

| | | | |
|---|---|---|---|
| 4,760,811 | 8/1988 | Hopper | 114/65 R |
| 5,036,788 | 8/1991 | Unger | 114/355 |
| 5,458,844 | 10/1995 | MacDougall | 264/310 |

*Primary Examiner*—Stephen Avila
*Attorney, Agent, or Firm*—Abelman, Frayne & Schwab

[57] ABSTRACT

An integrally moulded plastic outboard motor boat hull structure is provide with reinforcement at its transom region. The reinforcement is in the form of gusset members which integrally connect the transom region to stiffening members that longitudinally extend between the bow and stern ends of the boat hull. An intermediate saddle member connects the outboard motor to the transom region, with the saddle member being preferably connected to at least one of the gusset reinforced longitudinal stiffening members. The overall structure serves to both reinforce the transom region, and transfer the dynamic motor forces away from the transom region, thereby significantly reducing the possibility of flex cracking within the transom region.

19 Claims, 6 Drawing Sheets

MOULDED BOAT HULL INCLUDING TRANSOM REINFORCING GUSSETS

FIELD OF THE INVENTION

This invention relates to a reinforced integrally molded plastic boat hull structure of the type shown in U.S. Pat. No. 5,458,844, which is formed of peripherally joined inner and outer shells with a plurality of longitudinally extending stiffening members between the inner and outer shells. In accordance with the present invention, the outboard motor load at the transom is reduced by reinforcing the transom and transferring such forces away from the transom to a reinforced region of the hull. This significantly reduces the flex cracking inducing forces which might otherwise be present through the transom and lead to its deterioration. More specifically, the present application is directed to the addition of integral gusset reinforcing means at the transom region and the connection of the outboard motor via an intermediate saddle like fixture which is preferably connected to the reinforced transom structure in a manner which substantially transfers the dynamic motor load forces away from the transom.

DESCRIPTION OF THE PRIOR ART

The materials of construction for a boat hull require the combination of formability, strength, attractive appearance, low maintenance and durability in the marine environment. For a very substantial period of time boat hulls of varying sizes have been constructed of wood. However, such boat hulls disadvantageously require substantial maintenance and are subject to deterioration. In addition wooden hulls require substantial labor costs for construction and use of increasingly costly wood materials.

More recently boat hulls have been increasingly constructed of fiberglass. Fiberglass materials can be formed into the shape of boat hulls and the resulting boat hull structure is sufficiently strong for boat hulls and advantageously has greater resistance to deterioration in the marine environment as compared to wooden boats. Hence, fiberglass boat hulls have become an increasingly popular material for boat construction.

There are, however, a number of problems with fiberglass as a material for boat construction. These problems include:

Manufacturing with fiberglass materials can be environmentally problematic. The release of volatile organic compounds that are distressing in both the manufacturing facilities and the immediate environs. The volatile organic compounds used in fiberglass manufacture are hazardous materials and can also be destructive to ozone in the atmosphere.

Both manufacturing waste and non-serviceable fiberglass products cannot be recycled and do not readily deteriorate in landfills. Management of fiberglass wastes is faced with increasing costs and limitation.

Fiberglass boat hulls, particularly in larger boat sizes, require internal reenforcement between the outer hull and the mechanically affixed deck. Such supports are generally provided by spaced vertical members, or "stringers", which are mechanically connected at their opposed edges to the internal surfaces of the hull and deck. As the boat hull is subjected to the stresses of its movement through water and wave, both tension and compression forces act on the outer hull and thus act conversely on the opposed edge of the stringers where they interface with the underside of the deck. This results in significant sheer forces within the stringer and at the interfaces of the stringers with the outer hull or deck. This can cause the rupture of the interconnection of the stringer to the associated hull and deck, resulting in serious damage to the boat hull structure, making it non-serviceable.

It has been suggested that the boat hull be moulded as a hollow plastic shell with an integral foam plastic reinforcement between the inner surfaces of the shell. The use of foam plastic material to provide increased strength between the inner surfaces of a shell is primarily of practical use for smaller size hulls because as the boat size increases the distance between the two shells to be filled with foam also increases. When such a boat hull is impacted, the compressional and tension sheer forces will be experienced in the foam which, similar to the stringers in the fiberglass boat, in deleterious rupture within the foam and the loss of its required strengthening effect.

Although boats of plastic resins such as polyethylene have many desirable characteristics, prior to U.S. Pat. No. 5,458,844 it has not been feasible to commercially produce water craft of plastic material in all the most popular recreational types and sizes. Such boats include an integrally molded shell with a series of spaced longitudinal stiffening members extending between the bow and stern. Hence, by overcoming the prior structural limitations to produce boats of substantial size from plastic, the method and structure disclosed in aforementioned U.S. Pat. No. 5,458,844 has provided dramatic end benefits to consumers including: Such, the boats are significantly more efficient and maintenance free since the surface characteristics of the plastic are such that sea life will not grow thereon, thereby maintaining a slippery hull. As a consequence, the craft is not only significantly more fuel efficient over the course of use, as well, there is no need for expensive anti-fouling paints finishes. Indeed, since the color is integral throughout the thickness of the plastic, there is no need for a covering paint, thereby avoiding deleterious blistering or cracking. Further, scratches and other abrasions can be buffed away or are less visually disconcerting.

SUMMARY OF THE INVENTION

In solving the structural limitations which heretofore have restricted production of a variety of plastic boats one potential problem has been the forces exerted on the transom by the weight of the outboard motor. The present invention reinforces the integrally molded transom and transfers the outboard motor weight load, and in particular those created during boat movement, away from the transom to other portions of the hull. This serves to avoid flex cracking over prolonged usage, which might otherwise occur within the transom region. Hence, a plastic outboard boat moulded in accordance with aforementioned patent U.S. Pat. No. 5,458,844 and including the transom reinforcement and motor mounting of the present invention is structurally sound over extended use and does not require the expensive and time consuming upkeep of prior non plastic molded boats. It is safer since such the hull is rigid, has minimal cosmetic deformation and hence is significantly resistant to damage when impacted. Thus it is less likely than fiberglass to incur damage if it comes in contact with the dock or rocks.

Its displacement is comparable to that of fiberglass boats of like size and thus it can be driven by conventional outboard marine engines mounted according to the preferable arrangement of the present invention. Moreover, given the less expensive nature of the raw moulding material, marine craft of comparable size to fiberglass and having a longer anticipated trouble free life can be fabricated at substantially lesser cost.

Recognizing the need to mould plastic boat hulls which can be used for both large and small vessels, aforementioned U.S. Pat. No. 5,458,844 disclosed a unique rotational moulding process for integrally forming a reinforced boat hull having appropriate integrally formed longitudinal stiffening members. Due to their integral formation, the supports act in the nature of structural beams moulded to surfaces of the inner and outer shell. The present application includes the addition of reinforcing gussets at the transom region, preferably as integral vertical extensions of at least some of the longitudinal stiffening members at their juncture to the transom. An intermediate saddle like fixture extends over the top and along the opposed inner and outer surfaces of the transom. The saddle is positioned intermediate the outboard motor and transom region, with the saddle being preferably secured to the gusset extension of at least the centerboard stiffening member. This advantageously channels the dynamic forces attributable to the motor weight to the gusset reinforced region, thereby relieving the transom. That is, the gussets in association with the saddle member not only serve to reinforce the transom region with respect to the outboard motor forces, but direct those forces away from the transom, thereby avoiding transom cracking. As a consequence the overall hull is able to better withstand the dynamic forces encountered during extended usage to provide the requisite structural strength without damage to the transom region.

More specifically, the integrally moulded boat includes a plurality of longitudinally extending stiffening members between the bow and stern sections. Advantageously, as is the subject matter of co-pending application serial number 08/561418 of Nov. 21, 1995, transverse reinforcing means transversely extend across the interior of the boat hull and are structurally fixed to the freely extending ends of the longitudinally extending stiffening members. When such an integrally moulded boat shell structure is designed for outboard motor use, the outboard motor is conventionally mounted to the transom region along the stern end of the boat. During usage of the boat, the dynamic forces originating from the weight of the motor tends to repeatedly flex the transom region. Over an extended period of time, the concentration of such flexure forces at the transom region, which may be typically moulded of a polyethylene polymer product, (although other engineered resins may be used), may result in transom flex cracking. Once initiated, such flex cracking will advance, ultimately leading to significant boat deterioration.

Recognizing the vulnerability of the transom region to such flex cracking, the present invention provides for integral reinforcement of the transom region, while transferring the above discussed forces away from the transom region to other portions of the boat which will be better able to absorb same over long periods without any boat damage. The reinforcement is provided by integrally formed gusset members at the transom, which are preferably vertical extensions of at least some of the longitudinal stiffening members. Advantageously, one such gusset member should be provided along the center line of the hull. However, gusset reinforcement members may be provided which are not an integral extension of the longitudinal stiffening members. Such gussets may be provided either by themselves, or, preferably to augment the gusset support extensions of the longitudinal stiffening members.

In addition to the gusset reinforcement at the transom region, a saddle like fixture is interposed between the outboard motor and transom. The saddle includes a generally U-shaped cross section, which is appropriately sized to fit over and tightly engage the inner, top, and outer surfaces at the transom region. Preferably, the saddle includes at least one longitudinal extension which fits over the center line longitudinal stiffening member and its gusset extension. The saddle is securably connected to the transom, and preferably also at least to the center line longitudinal stiffening member and its gusset extension. This connection is preferably obtained by threaded inserts which will be moulded into predetermined regions of the transom, longitudinal stiffening member and its reinforcement gusset, during the rotational moulding of the boat hull. Bolts are then used to connect the saddle to the transom, longitudinal stiffening member(s) and gusset(s).

The outboard motor is in turn mounted to the saddle. Accordingly, a substantial portion of the flexure forces which would normally directed to the transom, will now be transferred, via the saddle, to other portions of the boat, including the longitudinal stiffening member and its reinforcing gusset. Accordingly, there will be a substantial relieving of forces, which might otherwise subject the transom to flex cracking resulting from the weight of the outboard motor during dynamic conditions.

To further enhance the structural reinforcement of the transom, diagonal gussets may also be provided in addition those reinforcement gussets which are an integral portion of, and extend from, the longitudinal stiffening members.

To provide for additional force transfer, longitudinal stiffening members alongside the center line may also include gusset sections extending to the transom region, and these side stiffening members may also be connected to the motor supporting saddle.

To further reinforce the transom region it will have a somewhat honeycombed cross section. The inner and outer moulds forming same will be shaped to establish alternate hollowed and thickened planar sections. This cross section of spaced hollow areas interconnected by thickened planar areas serves to further strengthen the transom, as contrasted to a uniform planar cross sectional transom. Further, when such a transom cross section is used in conjunction with the aforementioned gusset reinforcement extensions of the longitudinal stiffening members, and saddle bracket, the interior wall of the saddle bracket will be shaped to fit over a planar sections of the transom on either side of an intermediate, hollow section. The fastening of the motor supporting saddle to the transom will preferably be at the planar portions. This serves to further rigidize the transom and enhance the transference of the motor forces away from the transom to the gusset reinforced longitudinal stiffening member.

Accordingly, it is primary object of the present invention to significantly reduce the affect on the transom of the dynamic forces originating from the weight of the outboard motor.

A further object of the present invention is to provide an integrally moulded boat hull which includes gusset reinforcement at the transom region to minimize flex cracking which might otherwise result from the weight of the outboard motor.

Another object of the present invention is to provide such a moulded boat structure which strengthens the transom region, and transfers the dynamic motor forces to other parts of the boat.

Yet a further object of the present invention is to provide such a moulded boat structure which includes a plurality of integrally moulded longitudinally extending stiffening members, at least some of which having a gusset extension at their juncture with the transom.

Yet another object of the present invention is to provide a moulded boat structure, with transom reinforcement gussets, which further includes saddle type fixture intermediate the outboard motor and transom, which is integrally connected to at least one a reinforced region of the boat away from the transom.

Still a further object of the present invention is to provide such a integrally moulded boat structure, with strengthening transom gussets, and an intermediate saddle support for the outboard motor, in which the mechanical connection of the saddle to the boat serves to effectively transfer forces away from the transom to other portions of the boat.

Still a further object of the present invention is to provide such a boat construction, in which the saddle is securably connected to at least a gusset which is an integral part of, and extends upward from, the center line longitudinal support member.

Still an additional object of the present invention is to provide for further transfer of the motor load forces by also connecting the saddle to additional longitudinal support members on either side of the center line support member.

These as well as other objects of the present invention will become apparent upon a consideration of the following description and drawings.

BRIEF DESCRIPTION OF THE DRAWINGS

FIG. 3—3 is a cross sectional view, corresponding to FIG. 2 but showing the intermediate portion of the integrally moulded boat hull formed by the mould pair of FIG. 3.

DETAILED DESCRIPTION

Figure 1:
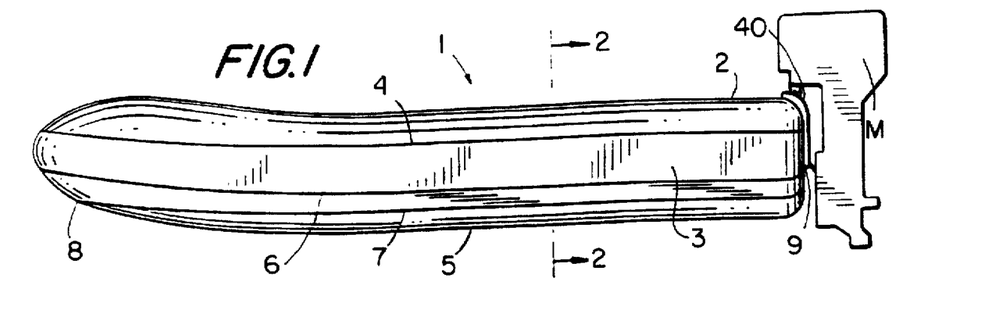
FIG. 1 is a side view of an integrally moulded plastic boat hull structure including the present invention.

With respect to FIG. 1 of the drawings there is provided an integrally moulded plastic boat hull for an outboard power boat generally indicated by arrow 1. As is the subject of aforementioned U.S. Pat. No. 5,458,844, the 1 is formed from a mouldable plastic material and comprises an inner shell 2 and an outer shell 3. The inner shell 2 is joined to the outer shell 3 along a joint line 4. The outer shell 3 comprises a keel 5 and outboard planing strake or chine 6 and planing strake 7 disposed between the keel 5 and joint line 4 and extending longitudinally from the region of the bow 8 to the transom region at the stern 9 of the hull 1.

An outboard motor M will be appropriately secured to the transom region 9 by an intermediate saddle like fixture 40, to be henceforth described in further detail The transom region 9 in accordance with the present invention will be reinforced to better withstand the dynamic forces developed by the motor. Further, the saddle is connected to the boat hull in a manner which transfers such forces away from the transom region 9.

Figure 2:
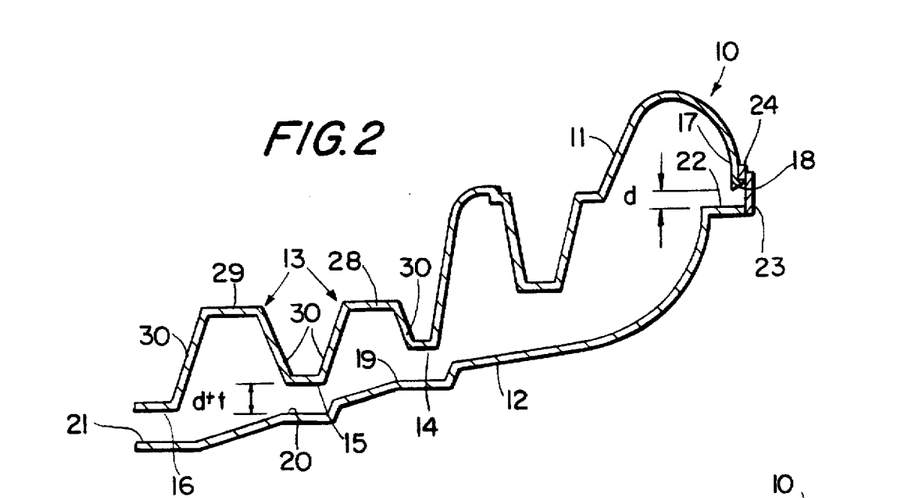
FIG. 2 is cross sectional view, corresponding to a half section at 2—2 of FIG. 1 showing the inner and outer shell moulds which may be typically utilized for forming the intermediate region of the boat hull of FIG. 1, the inner and outer shell moulds being shown separated during the initial stages of the rotary moulding process.

The hull is preferably formed by means of a rotary shell mould generally indicated by arrow 10 in FIG. 2. For convenience, only a half section of the mould 10 along an intermediate portion shown, of the hull is as viewed at a location corresponding to section 2—2 in FIG. 1. The mould 10 comprises an inner shell mould 11 and an outer shell mould 12.

The inner shell mould 11 is shaped so as to form an inner shell of the boat hull 1 and comprises hull stiffening members generally indicated by arrow 13 extending along a longitudinal axis of the mould 10. The stiffening members 13 have lower faces 14, 15 and 16, upper flanges 28, 29 and intermediate webs 30. Hence, the stiffening member provide a series of internal supports. The lower faces 14, 15, 16 will be integrally moulded to and extend inwardly from the outer hull 12, with spaced intermediate webs 30 with flanges 28, 29 at their opposite ends. An inner parting plate 17 with a wedge shaped protruding rim, or flange 18 inclined to face outward is advantageously provided substantially around the entire peripheral edge of the inner shell mould 11. Inner shell mould 11, will in accordance with the present invention also be configured at its stem end 9 to provide, in conjunction with complementary shaped outer mould 12, the reinforced transom region 9, as shown in FIGS. 4–7.

The outer shell mould 12 is shaped so as to form the outer shell 3 of the boat hull 1, with faces 19 and 20 for forming the chine 6 and planing strake 7 of FIG. 1, and keel face 21 for forming the keel 5 of FIG. 1. The upper peripheral edge of the outer shell mould 12 is formed as a substantially planar mating surface 22. Around the peripheral edge of the mating surface 22 is formed an outer parting plate 23 disposed substantially perpendicular to the mating surface 22.

The inner shell mould 11 and outer shell mould 12 are constructed such that when they are disposed adjacent to each other, the outermost edge of the wedge shaped rim 18 of the inner parting plate 17 is in sliding contact with an inner surface of the outer parting plate 23.

In FIG. 2 the inner shell 1 and outer shell 12 are shown separated from each other by means of a suitable separation mechanism (not shown in the figure) such that predetermined distance "d" is obtained between a bottom edge of the wedge shaped rim 18 and the mating surface 22, and such that the stake faces 19 and 20 and the keel face 21 are respectively separated from the lower faces 14, 15 and 16 of the stiffening members 13 by a distance "d+t" where "t" is the required final thickness of plastic in these regions. With the inner and outer shell moulds 11 and 12 assembled in this condition, moulding powder which has been poured into one of the shell moulds before assembly, is free to flow over the entire internal surface of the inner shell mould 11 and the outer shell mould 12 as the assembled mould 10 is tilted and rotated by a suitable mechanism (not shown in the drawings). To ensure that the moulding powder does not leak out between the contacting edges of the wedge shaped rim 18 and the outer parting plate 23, this area may be sealed with a heat resistant flexible sealant 24 such as a silicone sealer.

The moulding powder may typically be Dupont 8405 polyethylene, although other polymer moulding powders may be used.

The assembled mould 10 filled with a predetermined quantity of moulding powder is then heated by a suitable means, such as by a gas fired oven into which the assembled mould 10 may be placed, to a predetermined temperature and is rotated and tilted according to a predetermined program cycle. This ensures that the powder contained within the assembled mould 10 flows over the entire internal surface of the inner shell mould 11 and outer shell mould 12 and melts to form a skin of a predetermined thickness.

On completion of the program cycle, the separation mechanism is operated so that the inner shell mould 11 and the outer shell mould 12 may be brought together by the before mentioned predetermined amount "d" so that the bottom edge of the wedge shaped rim 18 abuts with the mating surface 22. At this time, any flexible sealant 24 around the peripheral joint is ruptured. During this process the mould plastic is still in a soft state. Consequently plastic formed on the surfaces of the inner face of the parting plate 23, the lower face of the wedge shaped rim 18 and a portion of the mating face 22 is squeezed towards the interior of the mould so that a section along the joint between the inner shell 11 and the outer shell 12 is formed to a predetermined thickness. This is shown as "w" in FIG. 3 which shows a half cross sectional view of the completed plastic hull viewed at A—A of FIG. 1.

Figure 3:
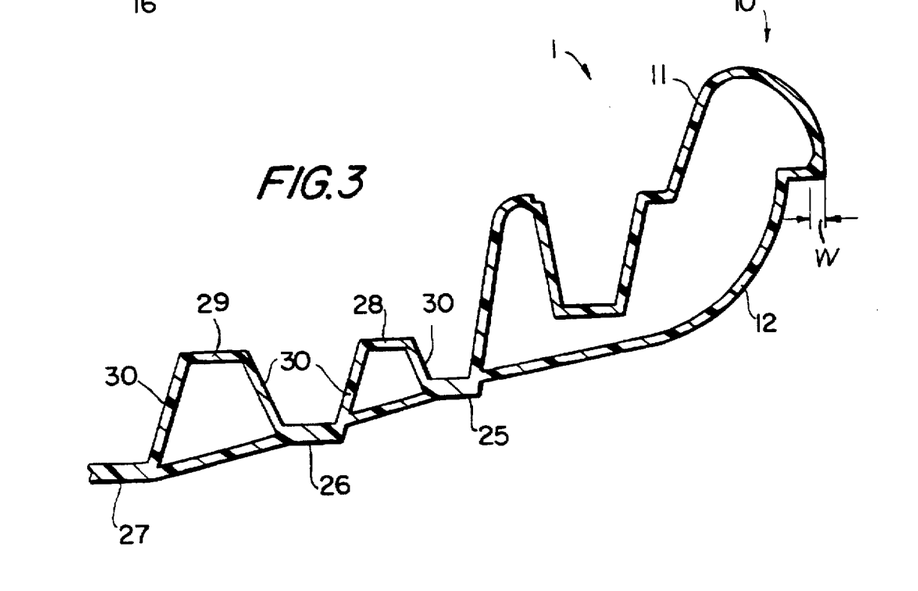

Also at the time of bringing the inner shell 11 and outer shell 12 together, adjacent internal surfaces of the plastic mould material i) covering the lower faces 14, 15 and 16 of the stiffening members 13, ii) the strake face 19, outboard strake face or chine 20 and the keel face 21 respectively are brought together so that the plastic mould material is squeezed together in a soft state thereby forming a homogeneous connection shown at chine 25, strake 26 and keel portion 27 FIG. 3. Advantageously an increased thickness of material is provided at 26, 27, and 28. The mould assembly is then allowed to cool and harden after which the inner shell mould 11 is separated from the outer shell mould 12, leaving the completed hull in accessible for removal from the outer shell mould 12. A transverse panel (not shown) may be structurally fixed to the flanges 28 and 29, spanning across both sides of the center line, as is the subject of serial No. 08/561,418 of Nov. 21, 1995.

Figure 4:
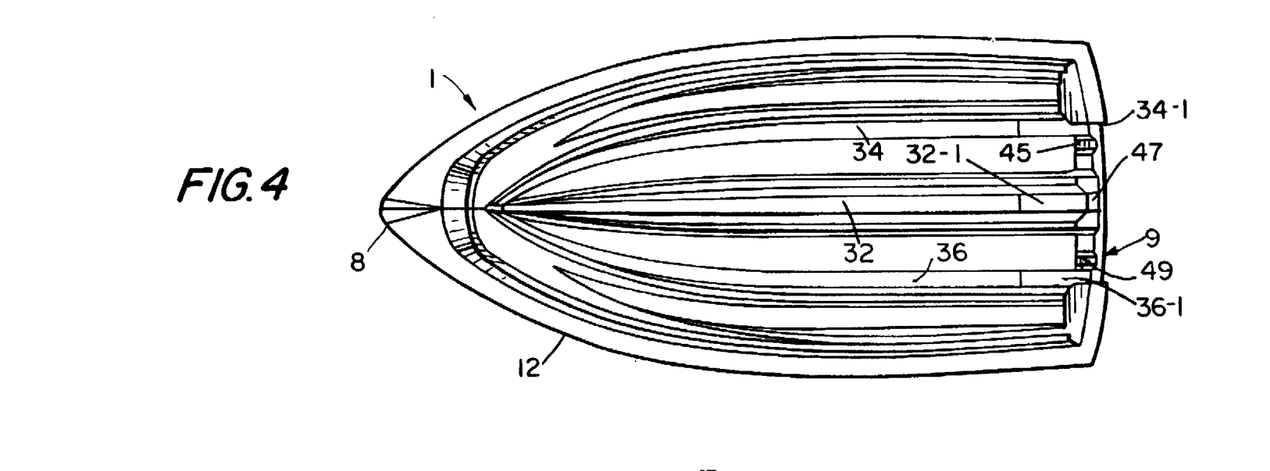
FIG. 4 is a top view of the boat hull, in accordance with the present invention, showing the reinforced transom region of the present invention, but prior to the addition of the outboard motor and intermediary saddle support.
Figure 5:
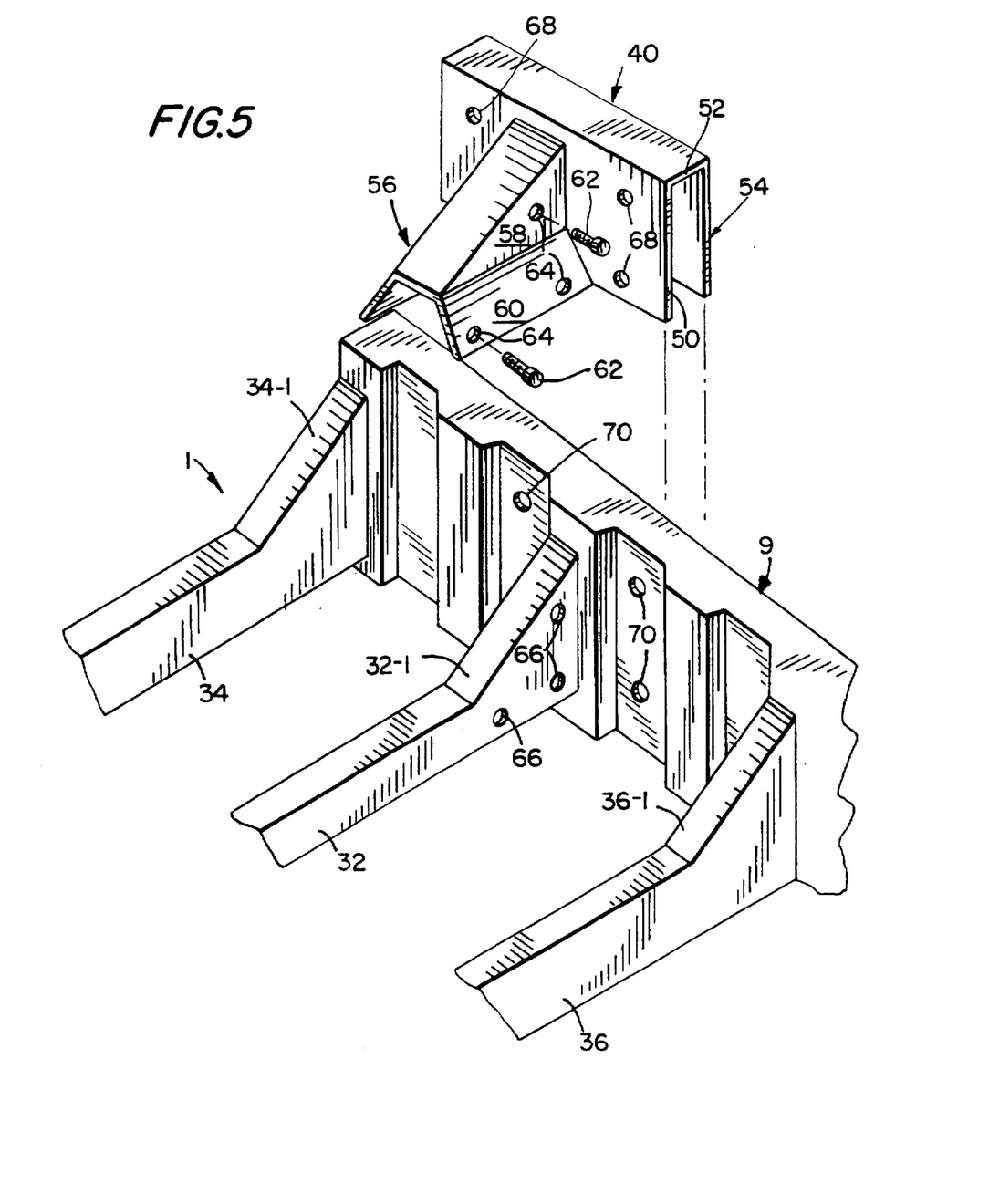
FIG. 5 is a perspective view, showing a portion of the transom region which has been reinforced in accordance with a preferred embodiment of the present invention, with the saddle connecting member being exploded out.
Figure 6:
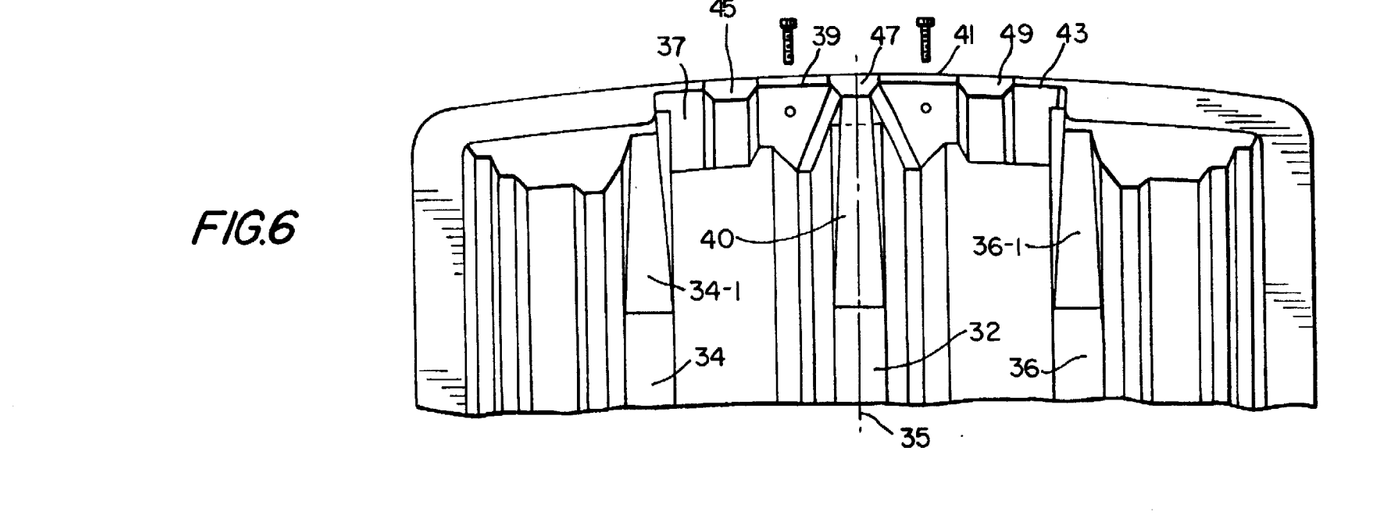
FIG. 6 is a top view of the portion of the transom region shown in FIG. 4, with the addition of the motor supporting saddle.

Reference is now made to the embodiment of the invention shown in FIGS. 4–6. The particular boat hull 1 shown therein has three longitudinal stiffening members, 32, 34 and 36 which generally correspond to the members 30-29-30 and 30-28-30 shown in FIG. 3. Stiffening member 32 extends along the center line of the boat hull, with stiffening members and 34 and 36 respectively being on either side of the center line. It is naturally understood that additional stiffening members may be provided for wider boats, with three such members 32, 34 and 36 being shown for exemplary purposes. The transom region 9 will advantageously be moulded of alternate planar (37, 39, 41, 43) and hollowed (45, 47, 49) sections with hollowed section 47 preferably lying along the center line, in alignment with the longitudinally extending stiffening member 32. These alternate planar and hollowed sections along the transom region 9 are integrally moulded into the boat hull by suitably configured regions of the inner and outer moulds, 11, 12, with the juncture of the moulds, or "kiss-off", being along the interior surfaces of planar sections 37, 39, 41 and 43.

In accordance with the present invention, the stern end extreme of each of the longitudinal stiffening members 32, 34 and 36 in communication with the transom region 9 includes a vertically extending gusset section, 32-1, 34-1 and 36-1, respectively as an integral portion thereof. Each of these gussets is in the shape of a right triangle with the hypotenuse extending between the top surface of its respective longitudinal stiffening member and the interior surface of the transom region 9, the elevation side lying against and integrally moulded to the interior surface of the transom region 9, and the horizontal side lying along and integrally moulded to the top surface of its respective longitudinal stiffening member. Hence, each of the gusset sections 32-1, 34-1 and 36-1 gradually slopes vertically upward from the top surface of its respective longitudinal stiffening member to the interior surface of the transom region, such that the triangular shaped gusset section will be of maximum cross section at its juncture with its integral moulded connection to the interior surface of the transom region 9. Hence, it should be readily understood that the gusset extensions of each of the longitudinal stiffening members 32, 34, and 36 provide significant additional support and rigidizing of the transom region 9, onto which the outboard motor M (not shown in FIGS. 4-6) will be subsequently attached.

In accordance with a particularly advantageous aspect of the present invention, in addition to the gusset sections for rigidizing transom member, the outboard is connected to the transom region via an intermediate saddle 40. The saddle 40 is preferably formed of aluminum. Alternatively it could be formed of fiberglass, stainless steel, or other materials having the requisite structural strength, and ability to withstand the marine environment. The saddle member 40 is of a generally U-shaped cross section, including successive sides 50, 52 and 54 which are shaped to snugly fit over the interior, top and exterior surfaces of the transom region 9. Saddle 40 will also preferably include a forward extension 56 having a triangular portion 58, and generally opened ended rectangular portion 60, which is intended to snugly fit over center line gusset 32-1 and the portion of the longitudinal stiffening member 32 below the gusset 32-1. The securement of the saddle 40 to the hull is preferably provided by a plurality of bolts 62 which extend through apertures 64 in extension 58 of the saddle.

Apertures 64 will be in alignment with threaded inserts 66 which have been placed within the center line longitudinally stiffening member 32 and its gusset extension 32-1 during the moulding process. Hence, bolt 62 securably fastened the saddle member 40 to the integrally moulded longitudinally stiffening member 32 and its gusset 32-1. A similar series of apertures 68 along wall 52 of the saddle 40, and threaded inserts 70 at the transom region, are provided for further bolted securement of the saddle 40 and outboard motor (not shown in FIG. 5) to the transom wall.

By virtue of the intermediary saddle 40 in conjunction with the gusset support sections, the weight of the motor M, and particularly the dynamic forces developed thereby, will be substantially transferred away from the transom region 9 to the center line stiffening member 32. This transference of these forces, in conjunction with the strengthening of the transom region 9 will serve to significantly reduce the tendency of the motor dynamic forces to initiate flex cracking within the transom region. Once initiated such flex cracking tends to spread, thereby affecting the useful life of the boat.

Figure 7:
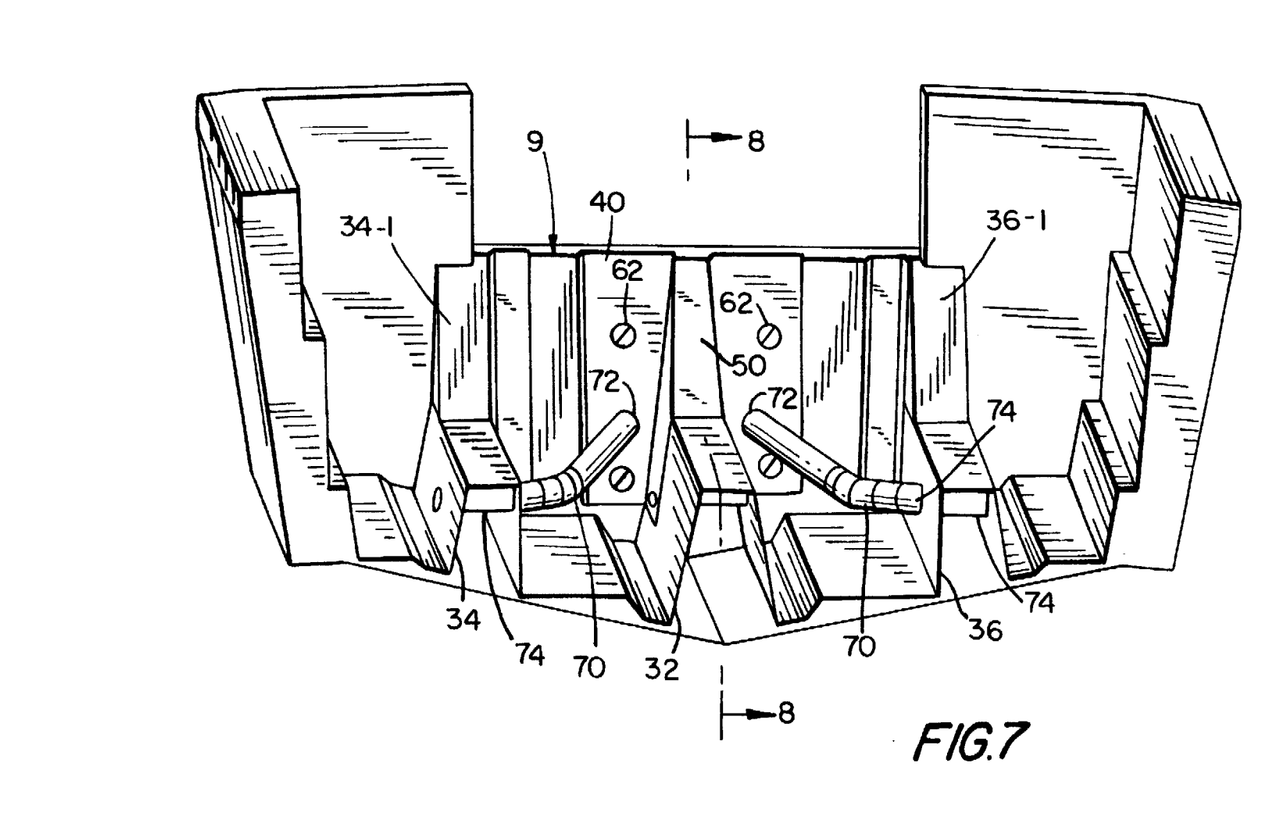
FIG. 7 is an end perspective view of a modified form of the transom reinforcement, which include additional transom reinforcement gusset members at side stiffening members and their associated saddle connections.
Figure 8:
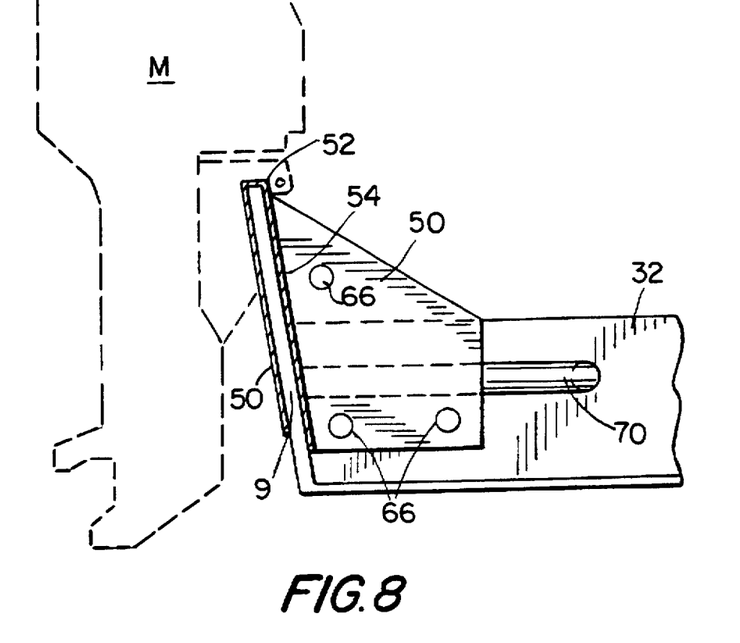
FIG. 8 is a cross sectional view of a portion of the transom region shown in FIG. 7, as indicated by the arrows 8—8 thereof, showing the addition of the outboard motor.
Figure 9:
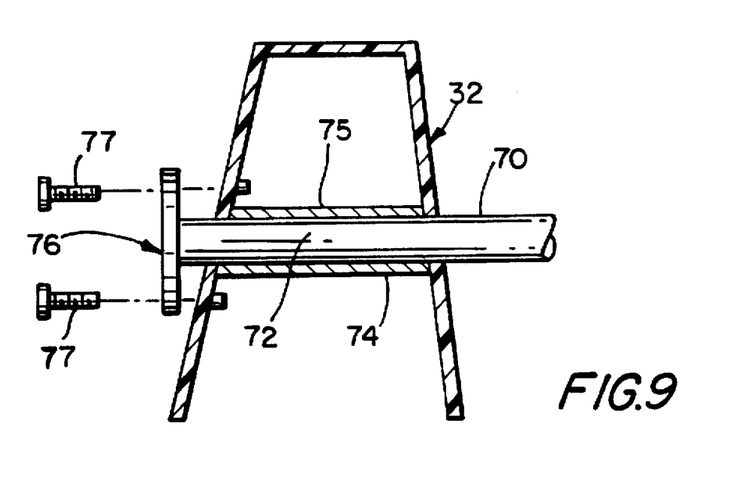
FIG. 9 shows the connection to the side stiffening members which include the additional gusset members.

Reference is now made to FIGS. 7–9 which provide a further modification to the embodiment shown in FIGS. 4–6. Additional transverse connecting tubes 70 (which may be aluminum tubes of approximately 1.5 inches diameter) have one end 72 connected to the saddle 40 and the opposite end section 74 connected to the respective side longitudinal stiffening members 34 or 36 through a compression sleeves 74 in the form of a tube which is moulded into each of the longitudinal stiffening members 34, 36 at the region of the transverse tube 70 connections. The connection of the tube 70 to sleeve 74 may be by adhesive 75 between their circumferential surfaces. In addition, a plate 76 may be welded to the end of the tube 70, which is then bolted by 77 to the longitudinal stiffening member as shown in FIG. 9. The opposite end 72 of tube 70 may be welded to saddle 40. Alternatively, an intermediary bracket (not shown) may be welded to the saddle to which the end 72 of tube 70 will, in turn, be welded. The transverse support tubes 70 transfer some of the motor induced dynamic load from the saddle 40 to the longitudinal stiffening members 34, 36. Hence, these additional force transmission paths, in addition to the load transferred to center line support member 32, served to further the dissipate the motor developed forces presented to the transom region 9, and distribute same over a greater portion of the reinforced boat structure.

Figure 10:
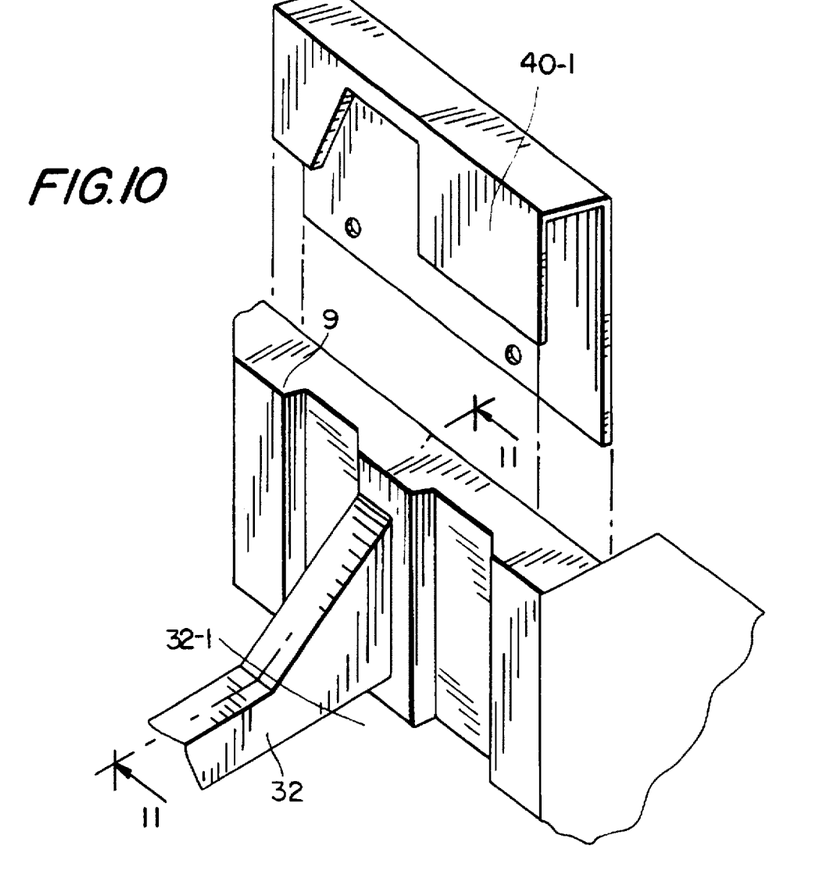
FIG. 10 is a perspective view of another embodiment of the invention, generally corresponding to FIG. 5, but in which the saddle is not physically connected to the longitudinal stiffening member which includes the gusset support.
Figure 11:
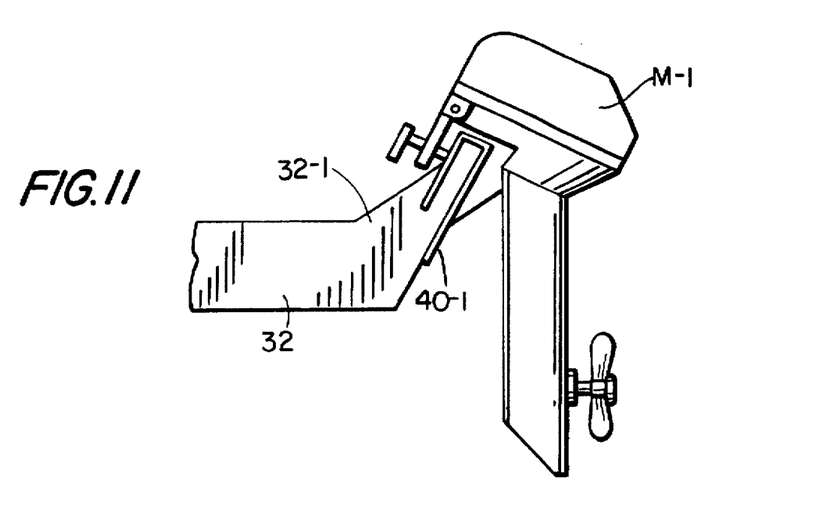
FIG. 11 is a simplified cross sectional view showing the manner in which the outboard motor would be connected to the embodiment shown in FIG. 9.

FIGS. 10 and 11 show a further modification of the invention in which the saddle member 40-1 which is intermediate the transom section 9 and outboard motor M does not include the extension portion 58 (as shown in FIG. 5) for connecting the saddle member to one of the integral longitudinal stiffening members 32. The extent to which the motor forces are transferred away from the reinforced transom 9 is of a lesser extent that is shown in the embodiments of FIGS. 4–8. The simplified arrangement of FIGS. 9 and 10 would be appropriate for smaller sized boats. The associated smaller motor M-1 in which the magnitude of the flexure forces may not necessitate the connection of the saddle 40-1 to the integral longitudinal stiffening member 32.

Accordingly it should be understood that although the present invention has been described in conjunction with specific embodiments, Modifications and additions may be made thereto without departing from the scope of the present invention as defined in the appended claims.

What is claimed is:

1. A reinforced plastic boat hull structure having bow and stem ends and, comprising:

an integrally formed hull, including inner and outer shells, with a plurality of stiffening members longitudinally extending between said bow and stern ends and integrally connecting said inner and outer shells:

a transom region at said stem end adapted to receive an outboard motor, and transom reinforcing means connected to said transom region;

said transom reinforcing means is provided by at least one of said longitudinally extending stiffening members which includes a vertical extension to form a gusset section integrally formed with and connected between said one stiffening member and the interior surface of said transom region.

2. A reinforced plastic boat hull structure according to claim 1, wherein:

said gusset section being in the shape of a right triangle, with the hypotenuse extending between the top surface of said longitudinal stiffening member and the interior surface of said transom region, the elevational side lying against and integrally connected to said interior surface of said transom region, and the horizontal side lying along the of top surface of said longitudinal stiffening member, whereby said gusset section gradually slopes vertically upward from said top surface of said longitudinal stiffening member to said interior surface of said transom region, such that said triangularly shaped gusset section is of maximum cross sectional area at its juncture with and integral connection to said interior surface of said transom region.

3. A reinforced plastic boat hull structure according to claim 1, wherein:

at least one of said longitudinal stiffening member extends along the center line of the hull, and said gusset section is integrally formed with said center line longitudinal stiffening member.

4. A reinforced plastic boat hull structure according to claim 2, wherein:

at least one of said longitudinal stiffening member extends along the center line of the hull, and said gusset section is integrally formed with said center line longitudinal stiffening member.

5. A reinforced plastic boat hull structure according to claim 1, and further including mounting means for mounting an outboard motor at said transom region, said mounting means including force transmission means for transmitting at least a portion of the dynamic outboard motor forces away from said transom region.

6. A reinforced plastic boat hull structure according to claim 5, wherein:

said motor mounting means including a saddle including a generally U-shaped section adopted to fit over, and snugly engage interior, top and exterior transom region surfaces, said saddle being connected to said transom, and interposed between said transom and the outboard motor.

7. A reinforced plastic boat hull structure according to claim 5, wherein:

said transom reinforcing means includes individual gusset means having at least a portion integrally secured to said transom region, and said motor mounting means being second to said transom reinforcing means.

8. A reinforced plastic boat hull structure according to claim 2, further including mounting means for mounting an outboard motor at said transom region, said mounting means including force transmission means for transmitting at least a portion of the dynamic outboard motor forces away from the transom region to said gusset section, said motor mounting means including a saddle including a generally U-shaped section adopted to fit over, and snugly engage interior, top and exterior transom region surfaces, said saddle being connected to said transom region, and interposed between said transom and the outboard motor, and said saddle further including a portion extending over, and connected to said longitudinal stiffening member at said gusset section.

9. A reinforced plastic boat hull structure according to claim 8, wherein:

at least one of said longitudinal stiffening members extends along the center line of the hull, and said gusset section is integrally formed with said center line longitudinal stiffening member.

10. A reinforced plastic boat hull structure according to claim 8, wherein:

said transom region and gusset section including threaded inserts integrally molded therein, said saddle member including aperture means in alignment with said threaded inserts, and bolts means extending through said aperture means, into said threaded inserts, for connecting said saddle to said transom region and gusset section.

11. A reinforced plastic boat hull structure according to claim 10, wherein:

at least one of said longitudinal stiffening member extends along the center line of the hull, and said gusset section is integrally formed with said center line longitudinal stiffening member.

12. A reinforced plastic boat hull structure according to claim 11, wherein:

said saddle means transfers dynamic outboard motor forces from said transom to at least said center line gusset section.

13. A reinforced plastic boat hull structure according to claim 1, wherein:

said transom region is of a cross section including alternate planar and hollowed sections.

14. A reinforced plastic boat hull structure according to claim 6, wherein:

said transom region is of a cross section including alternate planar and hollowed sections, said transom region and gusset section containing threaded inserts molded therein, said saddle member including aperture means in alignment with said threaded inserts, and bolts means extending through said aperture means, into said threaded inserts, for connecting said saddle to said transom region and gusset means, and said transom region threaded inserts being at said planar transom sections, separated by at least one hollowed section.

15. A reinforced plastic boat hull structure according to claim 14, wherein:

at least one of said longitudinal stiffening member extends along the center line of the hull, and said gusset section is integrally formed with said center line longitudinal stiffening member.

16. A reinforced boat hull structure according to claim 9, further including transverse connecting means for connecting said saddle to first and second longitudinal stiffening members at opposed sides of said center line longitudinal stiffening member, whereby the outboard motor forces are transmitted away from said transom region to said center line longitudinal stiffening member and said first and second longitudinal stiffening members.

17. A reinforced boat hull structure according to claim 16, wherein said first and second longitudinal stiffening member include gusset sections integrally formed with and connected between each of said first and second longitudinal stiffening members and the interior surface of said transom region.

18. A reinforced boat hull structure as set forth in claim 17, wherein the gusset sections of said first and second longitudinal stiffening member being in the shape of a right triangle, with the hypotenuse extending between the top surface of its respective longitudinal stiffening member and the interior surface of said transom region, the elevational side lying against and integrally connected to said interior surface of said transom region, and the horizontal side lying along the top surface of its respective longitudinal stiffening member, whereby each of said gusset sections gradually slopes vertically upward from said top surface of its respective longitudinal stiffening member to said interior surface of said transom region, such that each of said triangularly shaped gusset sections is of maximum cross sectional area at its juncture with and integral connection to said interior surface of said transom region.

19. A reinforced plastic boat hull structure having bow and stem ends and, comprising:

an integrally formed hull, including inner and outer shells, with a plurality of stiffening members longitudinally extending between said bow and stern ends and integrally connecting said inner and outer shells:

a transom region at said stern end adapted to receive an outboard motor and transom reinforcing means connected to said transom region;

at least one of said longitudinal stiffening member extends along the center line of said hull, and said transom reinforcing means is integrally formed with said center line longitudinal stiffening member.

* * * * *